United States Patent [19]

Hawk

[11] 3,737,203

[45] June 5, 1973

[54] BEARINGS

[76] Inventor: Beverly G. Hawk, 715 W. High St., New Philadelphia, Ohio 44663

[22] Filed: May 26, 1971

[21] Appl. No.: 147,032

[52] U.S. Cl. .................................................308/200
[51] Int. Cl. .............................................F16c 33/00
[58] Field of Search.....................300/706, 209, 199, 300/200

[56] References Cited

UNITED STATES PATENTS

| 260,585 | 7/1882 | Marston | 308/209 |
|---|---|---|---|
| 928,800 | 7/1909 | Schilling | 308/206 |
| 1,004,738 | 10/1911 | Bright | 308/199 |
| 3,058,789 | 10/1962 | Ham | 308/199 |

FOREIGN PATENTS OR APPLICATIONS

| 848,108 | 7/1939 | France | 308/199 |

*Primary Examiner*—Charles J. Myhre
*Assistant Examiner*—Frank Susko
*Attorney*—Gordon C. Mack

[57] ABSTRACT

Bearings are disclosed which are not round and which can replace flat circular bearings, spherical bearings and tapered bearings in a race.

9 Claims, 8 Drawing Figures

PATENTED JUN 5 1973 3,737,203

INVENTOR.
BEVERLY G. HAWK
BY
ATTORNEY

INVENTOR.
BEVERLY G. HAWK
BY
ATTORNEY 3,737,203

BEARINGS

This invention relates to flat non-circular, four-sided and three-sided tapered bearings. They are preferred to conventional circular, spherical and tapered bearings, respectively, because as they rotate they pump with them the lubricant in which they rotate.

Opposite faces of the flat bearings are triangles in which the distance from each apex to every point on the arc opposite it is the same, the four faces of the four-sided bearings are each such a triangle and perpendicular cross-sections of the tapered bearings are such triangles. If either the flat, four-sided or tapered bearing is put in a bearing race, it will rotate as a circular, spherical or tapered bearing, and such bearings may alternate or be otherwise mixed with conventional flat, spherical or tapered bearings. If no conventional bearings are included in the race, the bearings that are there will ordinarily be entirely immersed in lubricant. If alternate bearings are of the conventional type (either circular, spherical or tapered), some lubricant is, of course, required and the new bearings will more effectively pump the lubricant with them, as they travel in the race, than the conventional bearings. Thus, they can be used where ordinary bearings become very hot during prolonged use due to rapid rotation. For instance, the new bearings can be used satisfactorily as replacements of ordinary bearings in dentist's drills, etc.

The invention is further described in connection with the accompanying drawings, in which FIG. 1 shows flat bearings aligned in a race (with one cover of the race removed), alternating with circular bearings;

Figure 1:
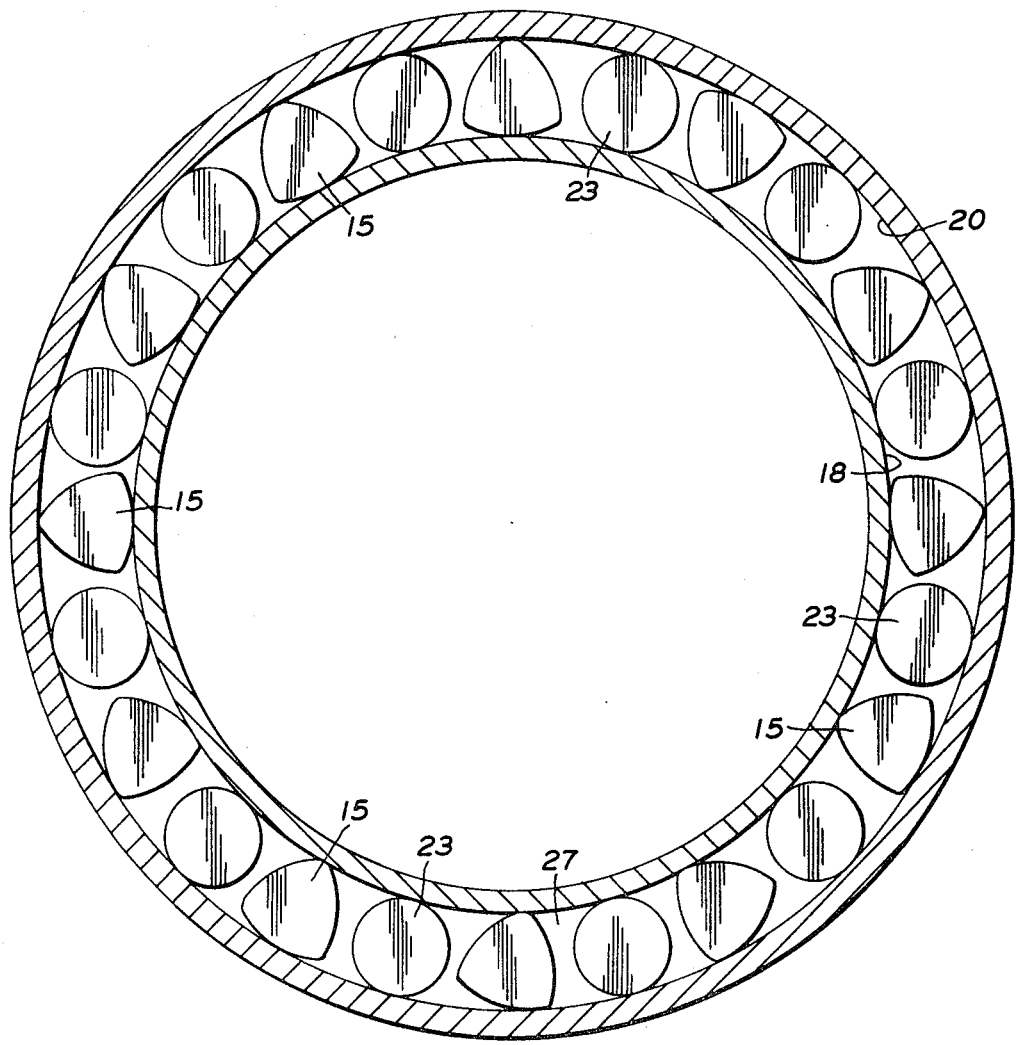
Figure 2:
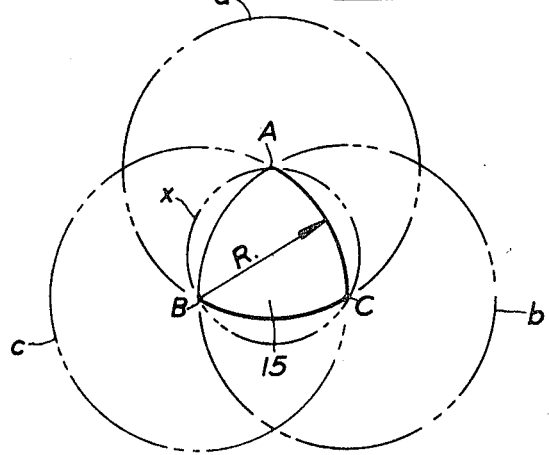
FIG. 2 illustrates the structure of the flat bearing.
Figure 3:
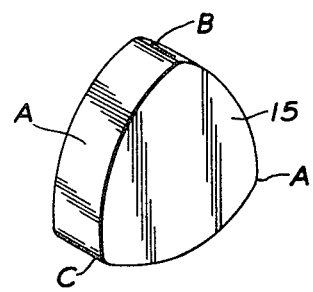
FIG. 3 is a view in perspective of the flat bearing.

FIGS. 1–3 illustrate the flat bearing and its use. The three circles $a$, $b$ and $c$ are of the same diameter and include each of the three apices A, B and C. These apices are also included in the circle X showing that all points on any arc AB, BC or AC are the same distance R from the apex opposite it.

A single bearing 15 is shown in FIG. 3, with apices A, B and C. Every point on the arc surface A' is the same distance from the apex A, and the same is true of the arc surface (not shown) opposite each of the apices B and C.

In the race shown in FIG. 1, each flat triangular bearing 15, regardless of its position, touches both circular walls 18 and 20 of the race and can be rotated within the race as readily as a circular bearing, with the added advantage that it pumps lubricant with it as it rotates about its center (the intersection of lines drawn from each apex to the middle of its opposite side). The walls 18 and 20 are to be rotated at different speeds. The spherical bearings 23 are spaced one diameter from each other.

The bottom 27 of the race and the top (not shown) are parallel. All of the bearings are flat and rotate easily between these parallel walls.

Figure 5:
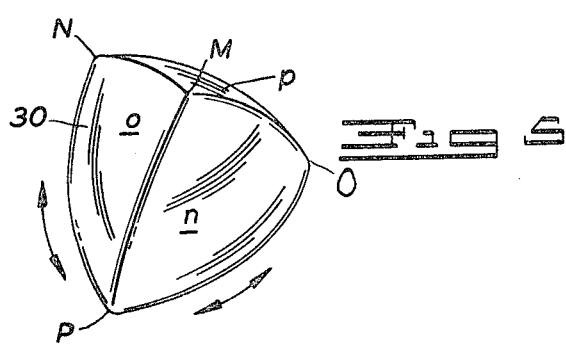
FIG. 5 is a view in perspective of the four-sided bearing, the arrows indicating that it will rotate on a flat surface or in a bearing race as smoothly as a spherical bearing.

FIG. 5 shows a bearing 30 with four faces, each of constant breadth. The faces are not flat, but spherical. The four apices M, N, O and P lie in a sphere the radius of which is somewhat shorter than the radius of the spheres of which the surfaces m (not shown), n, o and p are arcs, just as in FIG. 1 the radius R is shorter than the radius of the circles $a$, $b$ and $c$. Every point on the triangular surface n is the same distance from N and every point on the other three triangular surfaces, respectively, is the same distance respectively from each of the other apices M, O and P. If it were not so difficult to represent solids on a flat surface, we could picture four spheres bounding the solid shown in FIG. 5, just as we have shown three circles arcs of which bound the bearing 15 in FIG. 2.

Figure 4:
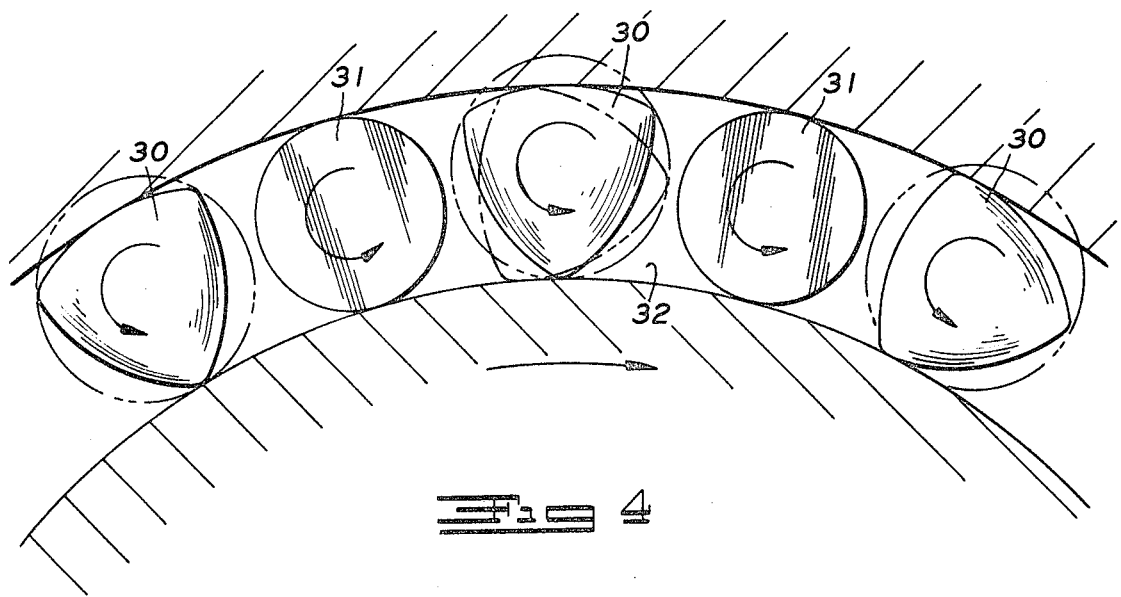
FIG. 4 shows four-sided bearings aligned in a race (with one cover of the race removed), alternating with spherical bearings.

The objects with triangular surfaces in which the distance from the apex to every point on the arc opposite it is the same, whether bounded by three or four such surfaces, function as bearings because the distance from an apex to every position on the opposite surface is constant. They roll in a race just the way a circular or spherical bearing rolls in a race. In FIG. 1, flat bearings of constant breadth 15, are shown alternating with flat circular bearings 16; and in FIG. 4, bearings 30 with four faces of constant breadth, are shown alternating with spherical bearings 31 in the race 32. In each situation, the bearings with surfaces of constant breadth will roll with the conventional bearings as well as conventional bearings and serve the same purpose, and in addition will better insure uniform distribution of the lubricant applied to them.

Figure 6:
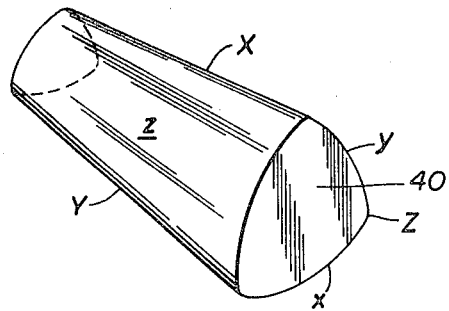
FIG. 6 is a view in perspective of a tapered bearing.
Figure 7:
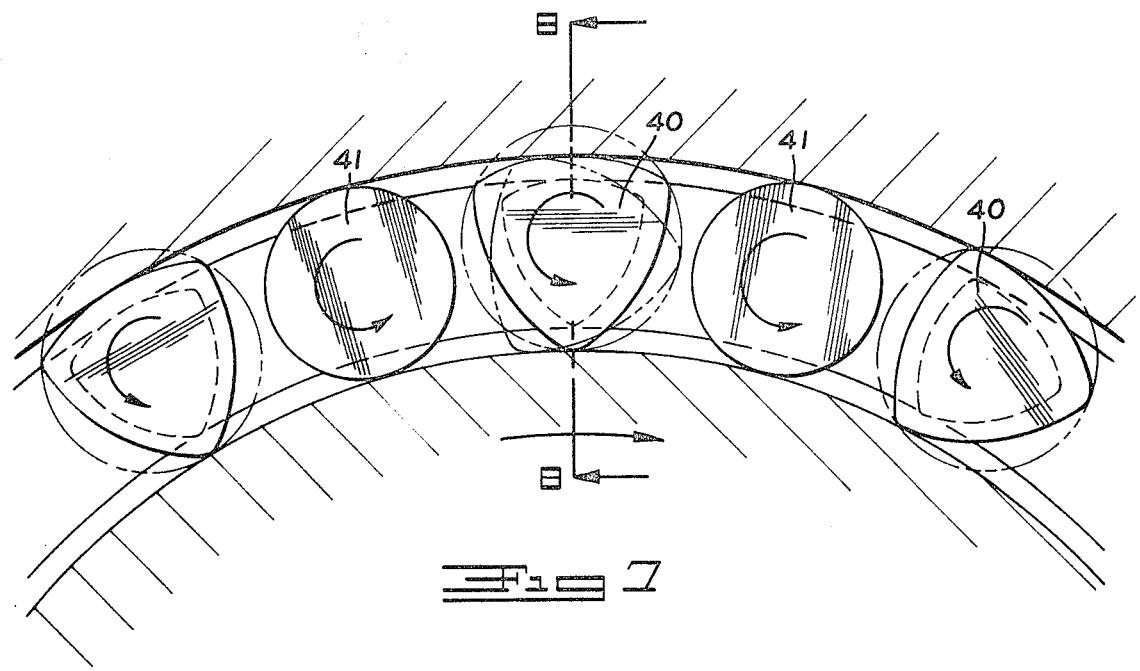
FIG. 7 is a longitudinal section through a race containing tapered bearings.
Figure 8:
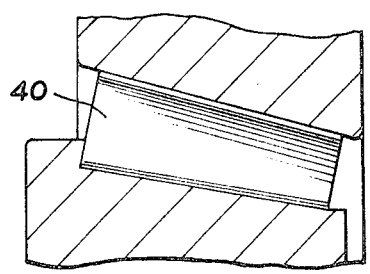
FIG. 8 is a section on the line 8—8 of FIG. 7.

FIG. 6 is a view of a tapered bearing 40. The three long sides are triangular surfaces in which the distance from each apex to every point in the arc opposite it is the same because in the ends of the bearings and in any vertical cross sections the distance from each edge X, Y and Z to every point on the curve opposite it, $x$, $y$ and $z$ is the same. These distances are all equal in each cross section. They operate in a race as tapered bearings and may alternate with conventional tapered bearings. FIGS. 7 and 8 are sections showing a triangular bearing 40 in a race, and in FIG. 7, such bearings are separated by tapered bearings 41 of circular cross section.

I claim:

1. In a race, a plurality of bearings at least one of which is not spherical but in traveling through the race contacts adjacent bearings with arc surfaces of triangles in each of which the distance from each apex to every point on the arc surface opposite it is the same.

2. The combination of claim 1 in which the one or more bearings having said arc surfaces are flat and have three such surfaces.

3. The combination of claim 1 in which the one or more bearings having said arc surfaces are each bounded by four such surfaces.

4. The combination of claim 1 in which the one or more bearings having said arc surfaces are tapered bearings.

5. The combination of claim 2 in which there is a flat circular bearing on each side of one of the bearings having three arc surfaces as defined.

6. The combination of claim 3 in which there is a spherical bearing on each side of one of the bearings having four arc surfaces as defined.

7. The combination of claim 4 in which there is a tapered bearing of circular cross section on each side of one of the bearings having said arc surfaces.

8. A tapered bearing having three edges and the surfaces of vertical cross sections are triangular surfaces in each of which the distance from the apex to every point on the arc opposite it is the same.

9. A four-sided bearing, each side being a triangle with the distance from each apex to every point in the triangle opposite being the same.

* * * * *